United States Patent
Isenberg et al.

(10) Patent No.: US 9,188,163 B2
(45) Date of Patent: Nov. 17, 2015

(54) CLEAN-IN PLACE SHAFT BUSHING

(75) Inventors: Timothy J. Isenberg, Marshfield, WI (US); John E. Zirbel, Marshfield, WI (US)

(73) Assignee: Custom Fabricating & Repair, Inc., Marshfield, WI (US)

( * ) Notice: Subject to any disclaimer, the term of this patent is extended or adjusted under 35 U.S.C. 154(b) by 1063 days.

(21) Appl. No.: 13/088,993

(22) Filed: Apr. 18, 2011

(65) Prior Publication Data
US 2011/0253182 A1    Oct. 20, 2011

Related U.S. Application Data

(60) Provisional application No. 61/325,612, filed on Apr. 19, 2010.

(51) Int. Cl.
| | |
|---|---|
| F16C 35/073 | (2006.01) |
| F16C 35/077 | (2006.01) |
| B08B 3/02 | (2006.01) |

(52) U.S. Cl.
CPC ............ *F16C 35/073* (2013.01); *B08B 3/02* (2013.01); *F16C 35/077* (2013.01); *F16C 2235/00* (2013.01)

(58) Field of Classification Search
CPC ....... B08B 3/02; F16C 35/073; F16C 35/077; F16C 2235/00
USPC .......................................... 134/198
See application file for complete search history.

(56) References Cited

U.S. PATENT DOCUMENTS

| | | | |
|---|---|---|---|
| 3,374,039 | A | 3/1968 | Voorhies |
| 3,494,673 | A | 2/1970 | Wilcox |
| 4,136,886 | A | 1/1979 | Sjoholm et al. |
| 4,511,255 | A | 4/1985 | Saucier |
| 4,525,094 | A * | 6/1985 | Johnson et al. ............ 403/11 |
| 4,861,044 | A | 8/1989 | Jay |
| 4,989,504 | A | 2/1991 | Jay |
| 5,618,107 | A | 4/1997 | Bartsch |
| 5,753,282 | A | 5/1998 | Tortosa |
| 5,779,359 | A | 7/1998 | Gambrill et al. |
| 6,082,889 | A | 7/2000 | Tortosa |
| 6,193,409 | B1 | 2/2001 | Brunson et al. |
| 6,572,261 | B1 | 6/2003 | Angerhofer et al. |
| 6,761,191 | B2 | 7/2004 | Rosen et al. |
| 6,866,414 | B2 | 3/2005 | Kupidlowski |
| 6,997,601 | B2 | 2/2006 | Feldmeier |
| 7,387,431 | B2 | 6/2008 | Blakley |

(Continued)

FOREIGN PATENT DOCUMENTS

| | | |
|---|---|---|
| FR | 2596474 | 10/1987 |
| GB | 1392047 | 4/1975 |

(Continued)

*Primary Examiner* — Jason Ko
*Assistant Examiner* — Spencer Bell
(74) *Attorney, Agent, or Firm* — Boyle Fredrickson, S.C.

(57) ABSTRACT

A shaft bushing is provided that can be automatically cleaned in place, without requiring manual cleaning by a technician, and that can be used with food processing equipment. The shaft bushing has a body with a circumferential sidewall, opposing ends, and an opening in at least one of the ends the can accept cleaning fluid thereinto. The opening may be defined by ends of longitudinal grooves that extend along the bushing and that may direct the cleaning fluid between the bushing body and the support structure, and/or the bushing body and the shaft.

10 Claims, 6 Drawing Sheets

(56) References Cited

U.S. PATENT DOCUMENTS

| | | |
|---|---|---|
| 7,402,023 B2 | 7/2008 | Kupidlowski |
| 2002/0097931 A1* | 7/2002 | Saito et al. .................... 384/107 |
| 2004/0120615 A1* | 6/2004 | Chase ............................ 384/42 |
| 2007/0000207 A1 | 1/2007 | Bernhard |
| 2008/0127836 A1 | 6/2008 | Bokelmann et al. |
| 2008/0131313 A1 | 6/2008 | Bokelmann et al. |

FOREIGN PATENT DOCUMENTS

| | | |
|---|---|---|
| NZ | 222763 | 2/1990 |
| NZ | 541574 | 5/2006 |

* cited by examiner

CLEAN-IN PLACE SHAFT BUSHING

CROSS-REFERENCE TO RELATED APPLICATIONS

This application claims priority from U.S. Provisional Patent Application Ser. No. 61/325,612 filed on Apr. 19, 2010, the entirety of which is expressly incorporated by reference herein.

BACKGROUND OF THE INVENTION

1. Field of the Invention

The invention relates to food processing equipment and, more particularly, to bushings that support rotating components within food processing equipment.

2. Discussion of the Related Art

Bushings that support rotating components within food processing equipment are known.

Clean-in-place systems for use with food processing vats are also known in the food processing industries. Such clean-in-place systems automatically spray cleaning fluid inside of food processing vats.

SUMMARY OF THE INVENTION

The inventors have recognized that in typical food processing vats and other food processing machines, the clean-in-place systems have been primarily designed to clean the inside walls of the vat or machine and large mechanical components that are housed in it, such as agitator or mixing devices, while other parts of the overall system have not been cleaned with these known clean-in-place systems. The inventors have also recognized that in typical food processing vats and other food processing machines, supports for rotating components, such as shaft supporting bushings, must be manually cleaned by technicians and, at times, are unable to be cleaned at the interfaces of the bushing and the rotating components. The present invention contemplates a shaft bushing arrangement for a food processing vat that addresses these and other inventor identified problems and drawbacks of the prior art.

In accordance with an aspect of the invention, a bushing for use with a clean-in-place system is provided that may be used with a food processing vat or other food processing machine. The bushing has a body with opposing ends and a circumferential side wall. The circumferential side wall includes (i) an outer surface that engages a support structure for holding the bushing in a generally fixed position, and (ii) an inner surface that defines an outer periphery of a bore that extends longitudinally into the body so that the bore can hold a shaft within the body of the bushing. At least one of the ends of the body has an opening that can accept a cleaning fluid thereinto. This may allow delivering of a cleaning fluid into the body so that it can be directed between (i) the body and the support structure, and/or (ii) the body and the shaft, such that the interfacing surfaces of the shaft, support structure, and bushing can be cleaned in place and without requiring manual cleaning by a technician.

In accordance with another aspect of the invention, a longitudinal groove extends into at least one of the outer and inner surfaces of the circumferential sidewall. The longitudinal groove extends in a generally longitudinal direction with respect to the body. An end of the longitudinal groove is defined by the opening at one of the ends of the body. This may allow cleaning fluid that enters the opening to flow along the longitudinal groove, which may promote dispersion of the cleaning fluid between the interfacing surfaces of the shaft, support structure, and bushing, and which may therefore allow the bushing to be cleaned in place.

In accordance with another aspect of the invention, multiple longitudinal grooves that are spaced from each other extend into the outer surface of the bushing circumferential side wall. In addition, multiple longitudinal grooves that are spaced from each other may extend into the inner surface of the bushing circumferential side wall. The multiple longitudinal grooves may direct the cleaning fluid through multiple flow paths with respect to the bushing, which may enhance dispersion of the cleaning fluid between the interfacing surfaces of the shaft, support structure, and bushing.

In accordance with another aspect of the invention, the body of the bushing includes a flange that extends radially from a portion of the circumferential side wall. The flange may extend from one of the ends of the body, and the longitudinal groove may extend into and along the outer surface of the circumferential side wall, and into and along an outer surface of the flange. The longitudinal groove may extend continuously along the circumferential side wall and the flange. The longitudinal groove may have a greater depth at the flange than at the circumferential side wall, and the bottom surface of the groove may be spaced a generally constant distance from a longitudinal axis of the body of the bushing. This may provide a generally straight and unencumbered flow path for the cleaning fluid through both the flange and the circumferential side wall which may enhance dispersion of the cleaning fluid between the interfacing surfaces of the shaft, support structure, and bushing.

In accordance with another aspect of the invention, the flange includes a circumferential groove that extends about its outer surface. This groove may provide an edge or lip on its opposing sides that a technician can grab and firmly grip for removing the bushing from its supporting structure in a toolless manner.

In accordance with another aspect of the invention, the cleaning fluid is delivered to the body of the bushing by spraying from a sprayer that is mounted in a fixed position and spaced from the bushing. The sprayer may deliver the cleaning fluid toward the flange end of the bushing and a shaft that is rotatably supported by the bushing. An exposed end of the shaft that is held by the bushing may be contoured, for example, hemi-spherically, to direct the cleaning fluid that contacts it across its outer surface and outwardly toward the bushing. This may enhance dispersion of the cleaning fluid between the interfacing surfaces of the shaft and bushing.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
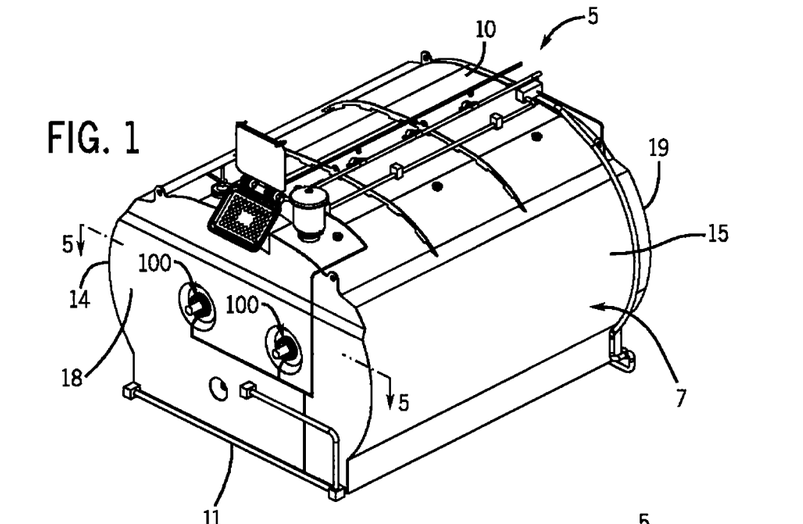
FIG. 1 is an isometric view from above and in front of a vat system incorporating a clean-in-place shaft bushing in accordance with the present invention.

FIG. 1 illustrates a clean-in-place bushing system 100 being implemented within a vat system 5. Vat system 5 can be used for processing food and related products. The clean-in-place bushing system 100 is described as being used in the vat system 5 to simplify its explanation, while noting that the clean-in-place bushing system 100 in other embodiments is implemented in various non-enclosed or other food processing machines, and/or other suitable machines having bushing supported rotating components.

Figure 2:
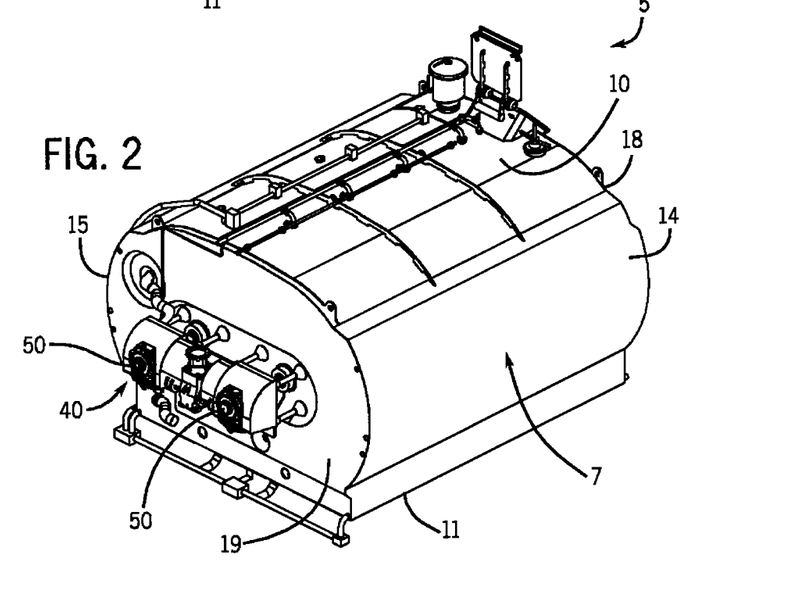
FIG. 2 is an isometric view from above and in back of the vat system of FIG. 1.
Figure 3:
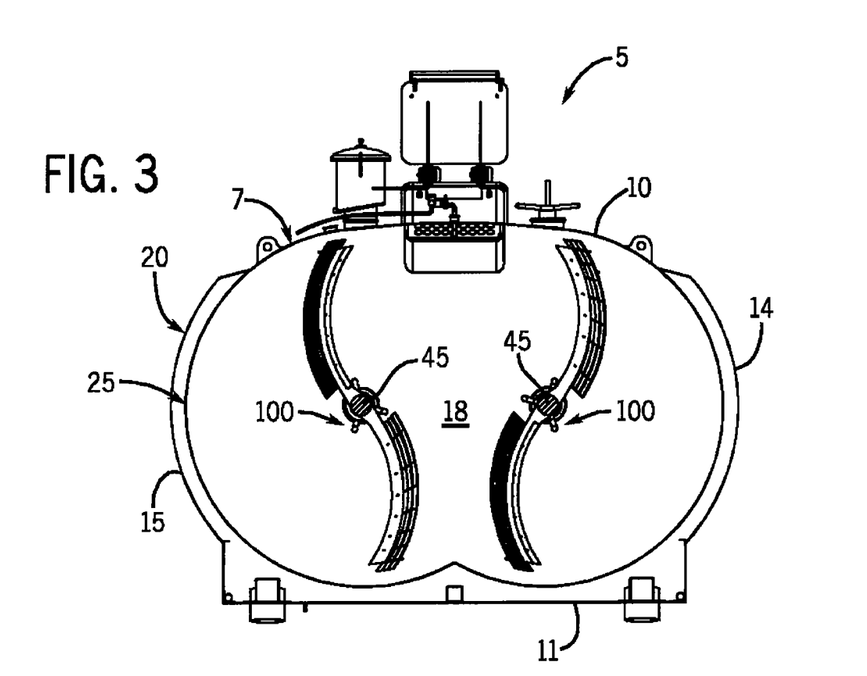
FIG. 3 is a sectional view of the vat system of FIG. 1.
Figure 4:
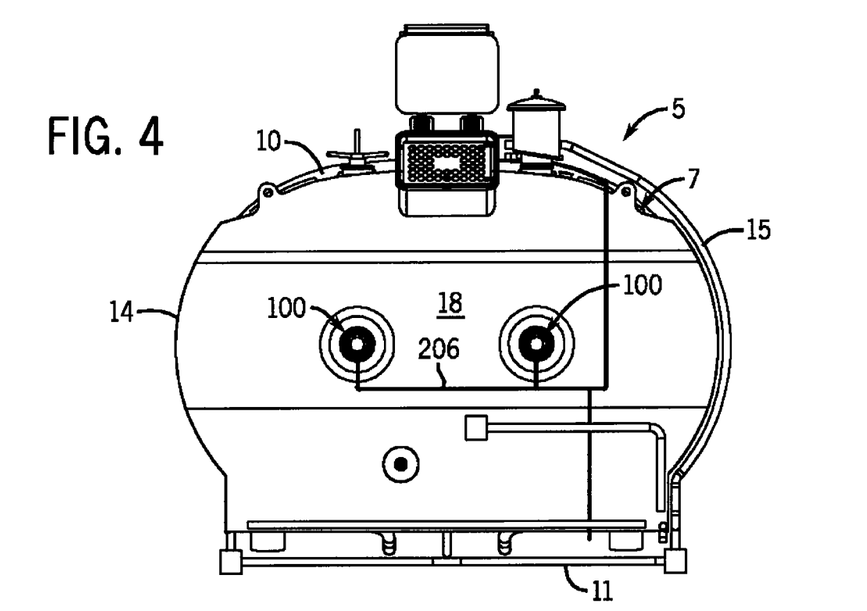
FIG. 4 is a front elevation view of the vat system of FIG. 1.

Referring now to FIGS. 1 and 2, vat system 5 can be used for processing the food and related products (collective referred to as "vat contents") by mechanically manipulating and heating or cooling the vat contents, depending on the particular food or related product being processed. In a representative application, the vat system 5 may be used in the production of cheese, although it is understood that the vat system 5 may be used in processing other types of food products. The system 5 includes a vat 7 that has an agitation system 40 which performs the mechanical manipulations tasks by using a motor that delivers power to a pair of drives 50 (FIG. 2) to rotate a pair of shafts 45 upon which blade assemblies are mounted, and a zoned heat transfer system to perform such heating and/or cooling to provide zoned temperature control to the vat 7.

Vat 7 defines an enclosure having a top wall 10, a bottom wall 11, and side walls 14, 15, all of which extend longitudinally between a pair of end walls 18 and 19. The walls 10, 11, 14, 15, 18, 19 are multilayered, having an outer jacket 20 and an inner shell 25 that are spaced from each other. Insulation and various components of the zoned heat transfer system are housed between the jacket 20 and shell 25. The shell 25 is the inmost structure of the vat 7, so that its inner surface surrounds and defines an outer periphery of a void or inside space 8 within the vat 7. A lower part of the inside space 8 resembles two horizontal parallel cylinders that transversely intersect each other, being defined by a lower portion of the shell 25 that has a pair of arcuate depressions which extend along the length of the vat 7, on opposing sides of a longitudinally extending raised middle segment. From the lower portion of the shell 25, opposing side portions extend in an outwardly bowed manner, arching away from each other in a transverse direction of the vat 7. An upper portion of the shell 25 arcs gradually between side portions of the shell 25 and defines an upper perimeter of the inside space 8 of vat 7.

Figure 5:
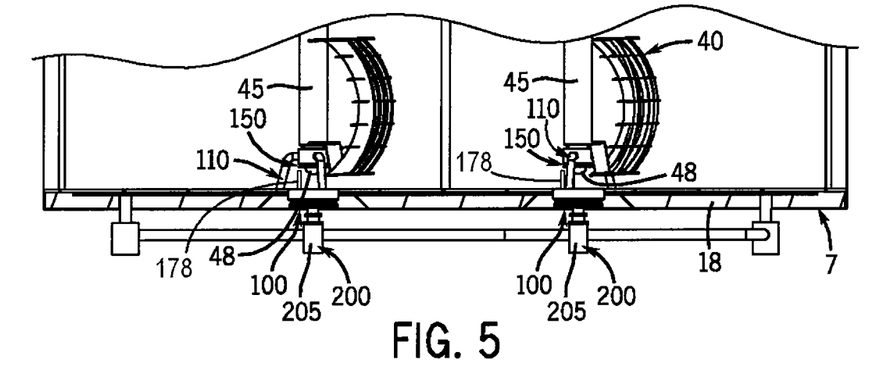
FIG. 5 is a sectional view of the shaft bushing of the vat system of FIG. 1, taken at line 5-5 of FIG. 1.
Figure 6:
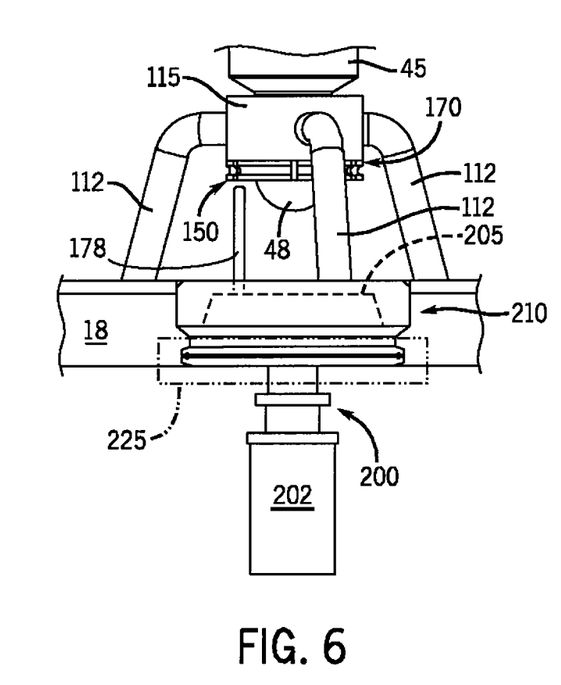
FIG. 6 is an enlarged sectional view of one of the clean-in-place shaft bushings of FIG. 5.

Referring now to FIGS. 5 and 6, clean-in-place bushing system 100 includes a bushing support 110, bushing 150, and spray system 200. The bushing support 110, bushing 150, and spray system 200 cooperate to allow respective interfacing surfaces of the bushing support 110, bushing 150, and the shaft 45 that is held in the bushing 150, to be cleaned in place and without requiring manual cleaning by a technician.

As shown in FIGS. 5 and 6, an end 48 of each of the shafts 45 that is furthest from the drives 50 (FIG. 2) is supported by the bushing 150 that is itself held by the bushing support 110.

Figure 7:
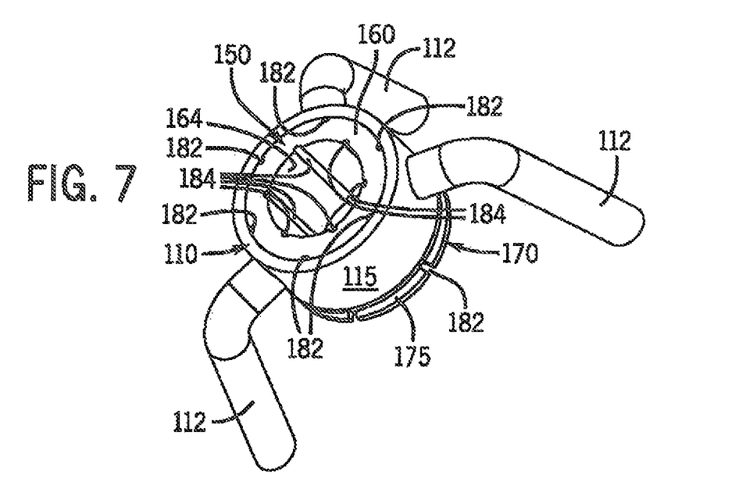
FIG. 7 is an isometric view of a clean-in-place bushing and bushing holder.

As shown in FIGS. 5, 6, and 7, bushing support 110 has multiple legs 112, each leg having an "L-shaped" configuration with a long segment that attaches to the vat end wall 18 (FIG. 5) and a short segment that extends toward and attaches to a collar 115 that concentrically holds the bushing 150.

Referring still to FIGS. 5 and 6, the ends of the long segments of the legs 112 are spaced further from each other on the end wall 18 than are the ends of the short segments that are connected to the collar 115. This large spacing of the long segments of the legs 112 distributes the load-bearing stresses across a relatively large surface area of the end wall 18, and also provides large gaps between adjacent legs 112, enhancing accessibility to the bushing 150. The long segments of the legs 112 are sufficiently long to space the collar 115 inwardly of the end wall 18 by a distance of at least about five inches, also enhancing accessibility to the bushing 150 and permitting its withdrawal from between the collar 115 and end wall 18.

Still referring to FIGS. 5 and 6, the bushing 150 is configured to receive the cleaning fluid from the spray system 200 while being housed in the collar 115. In this embodiment, the bushing 150 and collar 115 are positioned with respect to the spray system 200 and configured so that the cleaning fluid is received between (i) the bushing 150 and shaft 45, and (ii) the bushing 150 and collar 115.

Figure 8:
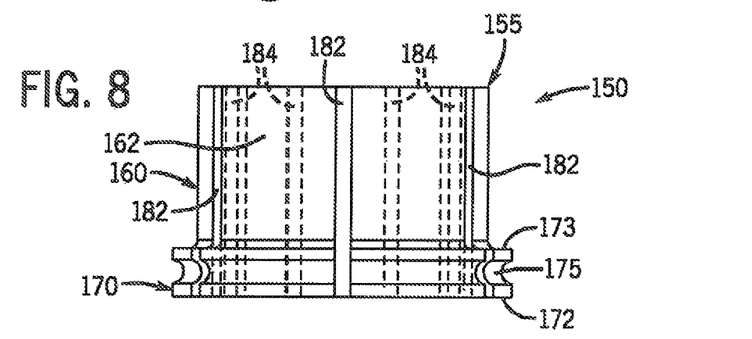
FIG. 8 is a side elevation view of the clean-in-place bushing of FIG. 7.
Figure 9:
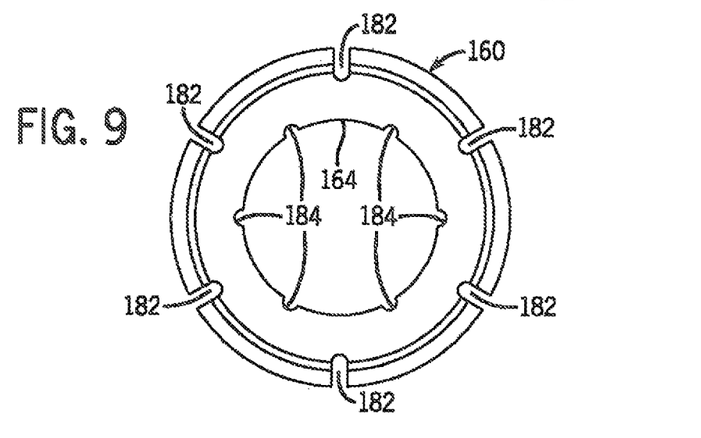
FIG. 9 is an end elevation view of the clean-in-place bushing of FIG. 7.

Referring now to FIGS. 7, 8, and 9, the bushing 150 has a main bushing body 155 with a circumferential side wall 160 and a flange 170 that extends radially outwardly from an end of the bushing body 155. In this embodiment, an outer end surface 172 of the flange 170 defines an end surface of the bushing body 155. Each end of the bushing body 155 has openings that are configured to accept cleaning fluid into or from which cleaning fluid may flow out. In this embodiment, the bushing body 155 is grooved and open ends of the grooves define the openings at the ends of the bushing body 155.

Still referring to FIGS. 7, 8, and 9, the circumferential side wall 160 has opposing outer and inner surfaces 162, 164. The outer surface 162 engages the collar 115 of the bushing support 110 as the supporting structure for the bushing 150. The inner surface 164 defines an outer periphery of a longitudinal bore in which the shaft 45 is housed within the bushing 150. The grooved configuration of the bushing body 155 is provided by longitudinal grooves 182, 184 that extend into and along the circumferential side wall outer and inner surfaces 162, 164, respectively. In this embodiment, six longitudinal grooves 182 are spaced equally from each other about the circumferential side wall outer surface 162, although it is understood that any other satisfactory number of grooves 182 may be employed, as desired. Six longitudinal grooves 184 are spaced equally from each other about the circumferential side wall inner surface 164. Again, it is understood that any other satisfactory number of grooves 184 may be employed, as desired. The longitudinal grooves 182 of the outer surface 162 are radially misaligned or clocked with respect to the longitudinal grooves 184 of the inner surface 164.

Referring now to FIGS. 8 and 9, in this embodiment, the longitudinal grooves 182 of the outer surface 162 are larger, wider, and deeper than the longitudinal grooves 184 of the inner surface 164. Longitudinal grooves 182 of the outer surface 162 of this embodiment have a width that is about 1.5 times larger than a width of the longitudinal grooves 184 of the inner surface 164. A depth of the longitudinal grooves 182 of the outer surface 162 is also about 1.5 times greater than a depth of the longitudinal grooves 184 of the inner surface 164. Such ratio of depths is even greater for portions of the longitudinal grooves 182 that extend through the flange 170 and have greater groove depths at those portions.

Still referring to FIGS. 8 and 9, for each of the longitudinal grooves 182, the bottom surface of the groove is spaced a generally constant distance from a longitudinal axis of the bushing body 155, at the portions extending along the circumferential side wall 160 and the flange 170. In this regard, each of the longitudinal grooves 182 extends in a straight path, providing a straight and unencumbered flow path through which cleaning fluid may flow along an entire length of the bushing 150 toward the outside of the bushing. The same is true toward the inside of the bushing 150, since the longitudinal grooves 184 extend in a straight path, providing a straight and unencumbered flow path through which cleaning fluid may flow along an entire length of the bushing 150 entering one end and exiting the other.

Referring again to FIGS. 5 and 6, the relative dimensions and configurations of the bushing 150 and bushing support 110 further allow such unencumbered flow of cleaning fluid along the entire length of the bushing 150 during use. Bushing 150 is held in the bushing support 110 in a relatively loose or non-interference-fit manner. When the bushing 150 is mounted in the bushing support 110, an inner end surface 173 (FIG. 6) of the flange 170 abuts the collar 115, preventing the bushing 150 from axially sliding through the collar 115 in that direction and further into the vat 7. The bushing 150 is restricted from movement in the other direction by a pin 178 (FIG. 6) that faces the outer end surface 172 of the flange 170. Pin 178 extends from a removable face plate 220 of a plate assembly 210, which is explained in more detail elsewhere herein. In the installed position, the pin 178 is spaced from the outer end surface 172 of the flange 170 to allow the bushing 150 to axially float within the collar 115 at least to some extent, for example, between about 0.05 inch and about 0.1 inch. Regardless of the particular spacing between the pin 178 and the bushing 150, the bushing 150 is held and aligned with respect to the spray system 200 so that the openings of the bushing 150, at the ends of the longitudinal grooves 182, 184, receive cleaning fluid that can flow through the longitudinal grooves 182, 184 and disperse between and wash across the bushing 150, shaft 45, and collar 115.

Referring still to FIGS. 5 and 6, spray system 200 includes a sprayer 202 that, in this embodiment, is a known fluid isolation valve and is mounted to the face plate 220 so that a nozzle 203 of the sprayer 202 extends through the face plate 220 and into the vat 7, with opening(s) of the nozzle facing the bushing 150 and shaft 45. Sprayer 202 is connected to a cleaning fluid supply line 206 which is connected to a known clean-in-place system (including suitable plumbing components, hardware components, and controls) that is configured to deliver cleaning fluid for automatically spraying down predetermined surfaces within the vat system 5. During use of the clean-in-place system, cleaning fluid is conveyed through the cleaning fluid supply line 206 and is delivered out of the sprayer 202 so that the cleaning fluid sprays through the air to the shaft 45, bushing support 110, and bushing 150.

Referring still to FIGS. 5 and 6, cleaning fluid that is delivered out of the sprayer 202 is forced into the openings of the bushing 150, whereby it flows through the longitudinal grooves 182, 184. Excess cleaning fluid is collected within the inside space 8 of the vat 7.

In this embodiment, the end 48 of each of the shafts 45 is rounded or hemi-spherically contoured. This rounded end 48 helps force the cleaning fluid that is delivered out of the sprayer 202 into the openings and longitudinal grooves 182, 184 of the bushing 150 by directing the cleaning fluid that contacts it across its outer surface and outwardly toward the bushing 150. Since the bushing 150 is relatively loosely held upon the shaft 45 and in the collar 115, some of the cleaning fluid that flows through the longitudinal grooves 182, 184 spills out in a transverse direction and flows through the clearances between (i) the bushing 150 and shaft 45, and (ii) the bushing 150 and collar 115. In so doing, the cleaning fluid tends to disperse between the bushing 150, shaft 45, and collar 115, washing their interfacing surfaces and purging the spaces between them with the cleaning fluid so as to remove any particles in those spaces.

Figure 10:
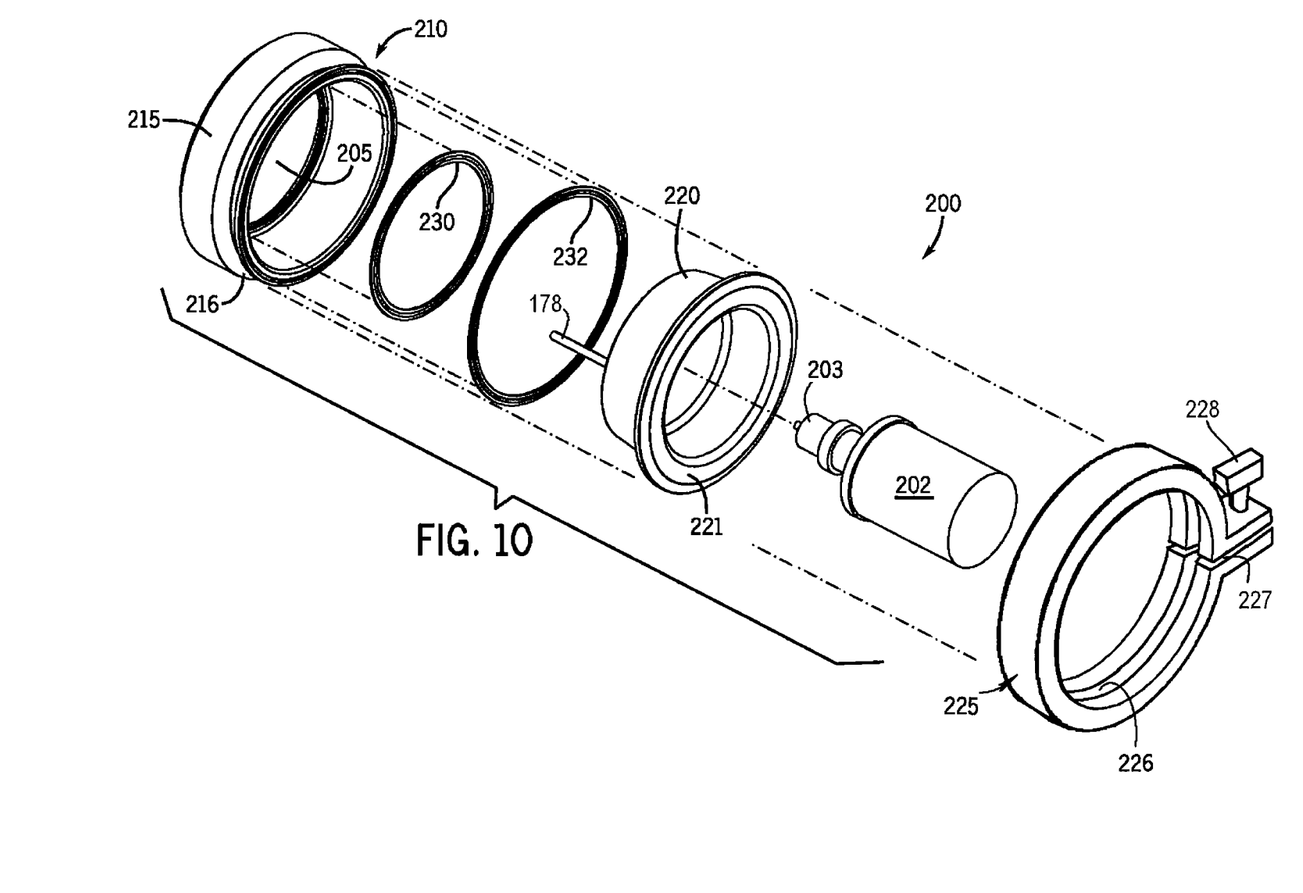
FIG. 10 is an isometric, exploded view of portions of a sprayer system.
Figure 11:
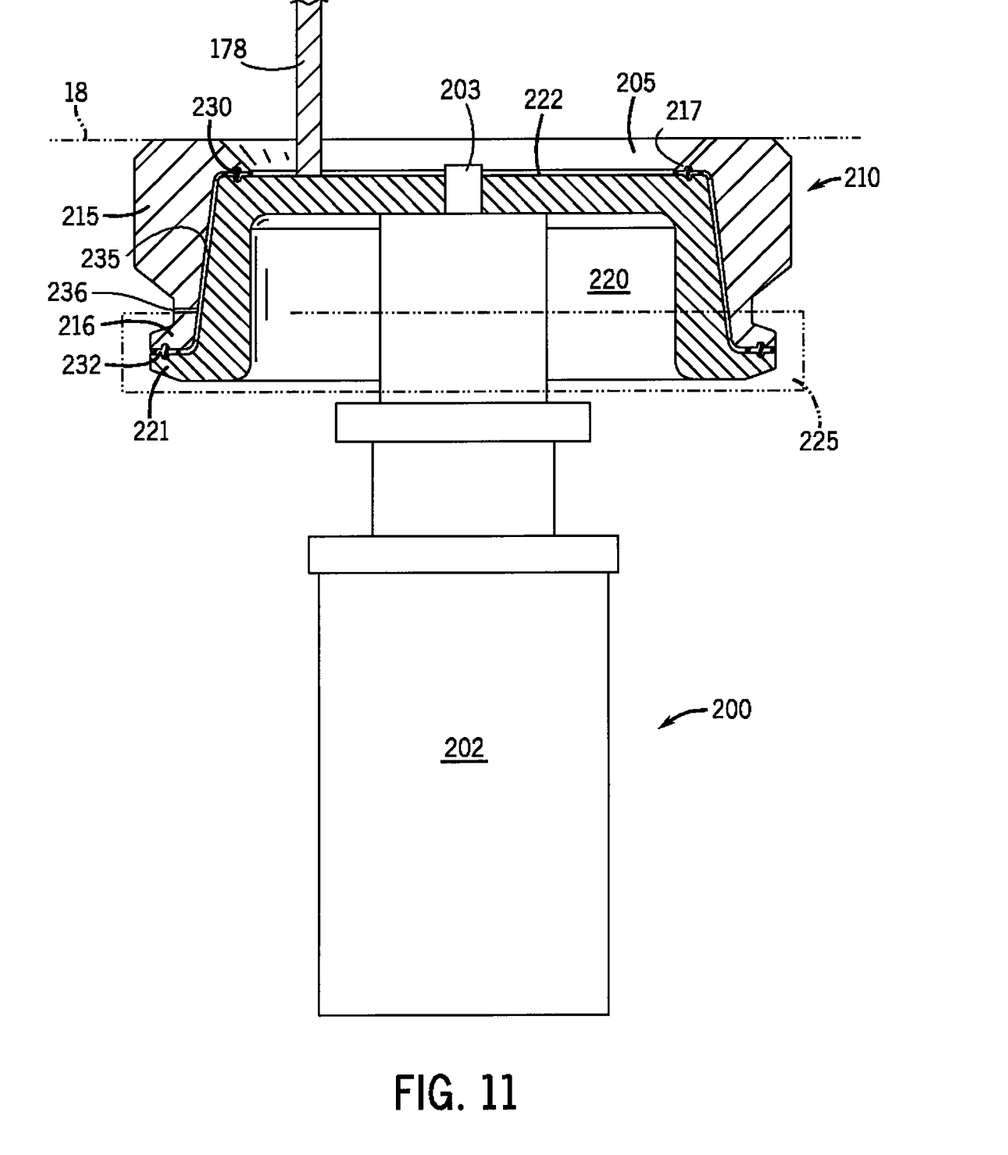
FIG. 11 is a sectional view of the assembly sprayer system of FIG. 10.

Referring now to FIGS. 6, 10, and 11, to inspect, service, or replace the bushing 150, a technician can access the bushing through the port 205 by disassembling the plate assembly 210. The plate assembly 210 includes an annular back plate 215 that is mounted to the wall 18 of the vat 7 and through which the port 205 is defined. The back plate 215 concentrically holds the face plate 220, and a clamp 225 that fits around and engages cooperating flanges 216, 221 of the back and face plates 215, 220 clamping them together. Shown best in FIG. 10, clamp 225 is substantially circular and has an inner circumferential groove 226 into which the flanges 216, 221 insert. Clamp 225 has a gap 227 in its perimeter that can be pulled closed with a thumbscrew 228. Pulling the gap 227 closed when the flanges 216, 221 are within the groove 226 wedges the flanges 216, 221 into the groove 226 which correspondingly pushes the flanges 216, 221 toward each other. An inner gasket 230 fits between an end surface 222 of the face plate 220 and a shoulder 217 of the back plate 215. An outer gasket 232 that has a larger diameter than the inner gasket 230 fits between the facing surfaces of the flanges 216, 221 of the back and face plates 215, 220. This allows the single clamp 225 to compress both of the inner and outer gaskets 230, 232 and seal the plate assembly 210 at two separate locations that are at opposing ends of the plate assembly 210. An annular space 235 is defined between the seals provided by the inner and outer gaskets 230, 232, respectively, and a leak detection bore 236 extends through the back plate 215 and into the annular space.

Referring now to FIGS. 6 and 8, to investigate a leak condition in the plate assembly 210 or, as mentioned above, to inspect, service, or replace the bushing 150, the clamp 225 is removed from the flanges 216, 221 of the back and face plates 215, 220, respectively, and the face plate 220 is removed from the back plate 215. Removing the face plate 220 moves the pin 178 away from the bushing 150 and also permits access to the bushing 150 through the port 205 for removal of the bushing 150 from the collar 115 by sliding it axially away from the shaft 45. In this embodiment, the outer surface 172 (FIGS. 6 and 8) of the flange 170 has a circumferentially extending groove 175 that defines edges or lips on opposing sides of the groove 175. Groove 175 may have a radius of curvature and thus opening width and depth of at least about 0.1 inch or 0.18 inch, for example, about 0.188 inch. Such width and depth of the groove 175 provides enough space between the edges or lips on opposing sides of the groove 175 to allow a technician to grab into the groove 175 with his or her fingers and pull against the flange 170 to remove the bushing 150 from the collar 115 without using any tools.

Various alternatives and embodiments are contemplated as being within the scope of the following claims particularly pointing out and distinctly claiming the subject matter regarded as the invention.

I claim:

1. A bushing and shat arrangement for use with a clean-in-place system comprising:
   a shaft having an exposed end with an exposed terminal surface of the shaft defining an angled outer surface defining a variable diameter of the exposed end of the shaft with a relatively smaller diameter defined at an outermost portion of the exposed end of the shaft;
   a bushing including a bushing body having
      a circumferential side wall (i) an outer surface that engages a support structure for holding the bushing in a generally fixed position, and (ii) an inner surface that defines an outer periphery of a bore that extends longitudinally into the bushing body, wherein the bore concentrically holds the shaft within the bushing body; and
      opposing inner and outer ends, wherein the outer end of the bushing body is arranged toward the angled outer surface of the end of the shaft and includes an opening that accepts a cleaning fluid thereinto for delivering the cleaning fluid between the bushing body and the shaft, and wherein the angled outer surface of the exposed end of the shaft and the opening at the outer end of the bushing body are configured to direct the cleaning fluid along the angled outer surface of the exposed end of the shaft and into the opening at the outer end of the bushing body; and
   wherein the angled outer surface of the exposed end of the shaft is defined by a rounded end surface of the shaft that is spaced from a sprayer facing the exposed end of the shaft and configured to deliver the cleaning fluid onto the rounded end surface of the shaft.

2. A bushing and shaft arrangement for use with a clean-in-place system comprising:
   a shaft having an exposed end with an exposed terminal surface of the shaft defining an angled outer surface defining a variable diameter of the exposed end of the shaft with a relatively smaller diameter outer portion of the exposed end of the shaft and a relatively larger inner portion of the exposed end of the shaft that is spaced inwardly from the relatively smaller diameter outer portion of the exposed end of the shaft;
   a sprayer that is spaced from and configured to deliver a cleaning fluid to the exposed end of the shaft during a clean-in-place cleaning procedure; and
   a bushing including a bushing body having
      a circumferential side wall with (i) an outer surface that engages a support structure for holding the bushing in a generally fixed position, and (ii) an inner surface that defines an outer periphery of a bore that extends longitudinally into the bushing body, wherein the bore concentrically holds the shaft within the bushing body; and
      opposing inner and outer ends, wherein the outer end of the bushing body is arranged toward the angled outer surface of the exposed end of the shaft and includes an opening adjacent the relatively larger diameter inner portion of the exposed end of the shaft that accepts the cleaning fluid thereinto for delivering the cleaning fluid between the bushing body and the shaft, and wherein the angled outer surface of the exposed end of the shaft and the opening at the outer end of the bushing body are configured to receive the cleaning fluid from the sprayer and direct the cleaning fluid along the angled outer surface of the exposed end of the shaft and into the opening at the outer end of the bushing body.

3. The bushing and shaft arrangement of claim 2, further comprising a longitudinal groove extending into at least one of the outer and inner surfaces of the circumferential sidewall and in a generally longitudinal direction with respect to the bushing body, an end of the longitudinal groove being defined by the opening in the at least one of the ends of the bushing body so that cleaning fluid that is accepted into the opening can flow along the longitudinal groove.

4. The bushing and shaft arrangement of claim 3, wherein multiple longitudinal grooves that are spaced from each other extend into the at least one of the outer and inner surfaces of the circumferential side wall.

5. The bushing and shaft arrangement of claim 3, the bushing body further comprising a flange that extends radially from a portion of the circumferential side wall, the flange engaging the support structure for restricting movement of the bushing.

6. The bushing and shaft arrangement of claim 5, the flange further comprising a circumferential groove that extends into an outer surface of the flange.

7. The bushing and shaft arrangement of claim 5, wherein the flange extends from one of the ends of the bushing body.

8. The bushing and shaft arrangement of claim 7, wherein the longitudinal groove extends (i) into and along the outer surface of the circumferential sidewall, and (ii) into and along an outer surface of the flange.

9. The bushing and shaft arrangement of claim 8, wherein the groove defines a depth that is relatively deeper at the flange and relatively less deep at the outer surface of the circumferential side wall.

10. The bushing and shaft arrangement of claim 9, wherein a bottom surface of the groove is spaced a generally constant distance from a longitudinal axis of the bushing body of the bushing.

* * * * *

UNITED STATES PATENT AND TRADEMARK OFFICE
CERTIFICATE OF CORRECTION

| | | |
|---|---|---|
| PATENT NO. | : 9,188,163 B2 | Page 1 of 1 |
| APPLICATION NO. | : 13/088993 | |
| DATED | : November 17, 2015 | |
| INVENTOR(S) | : Timothy J. Isenberg et al. | |

It is certified that error appears in the above-identified patent and that said Letters Patent is hereby corrected as shown below:

IN THE CLAIMS

CLAIM 1, column 7, line 2, delete "shat" and substitute therefor -- shaft --.

Signed and Sealed this
Eighth Day of March, 2016

Michelle K. Lee
*Director of the United States Patent and Trademark Office*